(12) United States Patent
Audeon et al.

(10) Patent No.: US 8,277,179 B2
(45) Date of Patent: Oct. 2, 2012

(54) TURBINE OR COMPRESSOR STAGE FOR A TURBOMACHINE

(75) Inventors: David Audeon, Massy (FR); David Da Silva, Juvisy sur Orge (FR)

(73) Assignee: SNECMA, Paris (FR)

( * ) Notice: Subject to any disclaimer, the term of this patent is extended or adjusted under 35 U.S.C. 154(b) by 837 days.

(21) Appl. No.: 12/266,929

(22) Filed: Nov. 7, 2008

(65) Prior Publication Data

US 2009/0123280 A1    May 14, 2009

(30) Foreign Application Priority Data

Nov. 13, 2007   (FR) ..................................... 07 07943

(51) Int. Cl.
*F01D 25/24*    (2006.01)
*F04D 29/52*    (2006.01)
(52) U.S. Cl. .................................. 415/214.1; 415/173.3
(58) Field of Classification Search .................. 415/178, 415/173.1, 173.3, 214.1, 173.4; 24/455, 24/20 R
See application file for complete search history.

(56) References Cited

U.S. PATENT DOCUMENTS

| 2,997,275 A * | 8/1961 | Bean et al. ..................... 415/135 |
| 6,435,820 B1* | 8/2002 | Overberg ....................... 415/138 |
| 6,575,697 B1* | 6/2003 | Arilla et al. ................. 415/173.1 |

FOREIGN PATENT DOCUMENTS

| EP | 1 079 077 A2 | 2/2001 |
| EP | 1 099 826 A1 | 5/2001 |
| EP | 1 462 616 A2 | 9/2004 |
| EP | 1 593 813 A1 | 11/2005 |
| EP | 1 840 339 A1 | 10/2007 |
| FR | 2 413 543 | 7/1979 |
| FR | 2 887 920 A1 | 1/2007 |

OTHER PUBLICATIONS

U.S. Appl. No. 12/257,761, filed Oct. 24, 2008, Audeon, et al.
U.S. Appl. No. 12/266,813, filed Nov. 7, 2008, Audeon, et al.

* cited by examiner

*Primary Examiner* — Caridad Everhart
(74) *Attorney, Agent, or Firm* — Oblon, Spivak, McClelland, Maier & Neustadt, L.L.P.

(57) ABSTRACT

A turbine or compressor stage for a turbomachine is disclosed. The stage includes a blade wheel surrounded by a sectorized ring carried by a casing. Each ring sector includes a circumferential rim that is clamped radially a casing rail by two clamps of C-shaped section that are engaged on the circumferential end portions of the rim of the ring sector and on the corresponding portions of the casing rail.

12 Claims, 2 Drawing Sheets

TURBINE OR COMPRESSOR STAGE FOR A TURBOMACHINE

FIELD OF THE INVENTION

The present invention relates to a turbine or compressor stage for a turbomachine such as an airplane turboprop or turbojet, the stage comprising a blade wheel mounted to rotate within a cylindrical or frustoconical ring made up of ring sectors that are disposed circumferentially end-to-end and fastened to a casing of the compressor or of the turbine.

At one of its ends, each ring sector has a circumferential rim that is clamped radially against an annular rail of the casing by means of a resilient clamp that is substantially of C-shaped section and that is engaged axially on the casing rail and on the circumferential rim of the ring sector.

BACKGROUND OF THE INVENTION

In the present state of the art, the clamps are disposed circumferentially end-to-end so as to constitute annular clamping means that extend over 360°. Each clamp is of an angular extent or width that is not less than that of a ring sector, with the number of clamps thus being less than or equal to the number of ring sectors.

When each clamp has an angular extent or width that is equal to that of the ring sectors, each clamp is generally engaged on the circumferential rim of a single ring sector so that the lateral faces at the circumferential ends of the clamp are substantially in alignment with the longitudinally-extending edges of the ring sector.

Each clamp is engaged on the casing rail and on the circumferential rim of the ring sector with a certain amount of radial prestress. In operation, a relatively large temperature gradient arises in the radial direction within each ring sector, thereby causing the ring sector to "unbend". This phenomenon gives rise essentially to an increase in the radius of curvature of the ring sector, thereby increasing stress in the middle portion of the clamp, which can reduce its lifetime.

OBJECT AND SUMMARY OF THE INVENTION

A particular object of the invention is to provide this problem with a solution that is simple, effective, and inexpensive.

To this end, the invention provides a turbine or compressor stage for a turbomachine, the stage comprising at least one blade wheel surrounded by a sectorized ring carried by a casing and including a circumferential rim that is clamped radially against an annular rail of the casing by means of resilient clamps that are substantially of C-shaped section and that are engaged axially on the casing rail and on the ring rim, wherein each ring sector is held against the casing rail by at least one clamp that is engaged solely on a circumferential end portion of the rim of the ring sector and on a corresponding portion of the casing rail.

Thus, according to the invention, the clamps are at a certain circumferential distance from one another and each of them is engaged solely on end portions of the ring sectors and on corresponding portions of the rail. No clamp is engaged on a middle portion of a ring sector and on the corresponding portion of the casing rail. The middle portion of each ring sector is thus free to move in a radial direction while the turbomachine is in operation without running the risk of damaging the clamps.

Each ring sector is thus held radially on the casing rail via at least one of its ends. In contrast to the prior art, the clamps are therefore never placed in abutting manner. The locking means do not extend continuously over 360°, thereby enabling their weight to be reduced significantly. The radial prestress of the clamps suffices to prevent them from moving circumferentially on the facing rail and on the rims of the ring sectors. It is also possible to provide systems for blocking them circumferentially in the event of the radial prestress of the clamps being insufficient or non-existent. The clamps are substantially identical to one another.

According to another characteristic of the invention, the clamps are of an angular extent or width that is less than the angular extent or width of a ring sector.

Each ring sector may be held against the casing rail by a single clamp, the clamp being engaged on a circumferential end portion of the rim of the ring sector and on a corresponding portion of the casing rail. The clamp may hold a single ring sector radially, or it may hold two ring sectors if it is mounted over two adjacent ring sectors.

In a variant, each ring sector is held against the casing rail by two clamps, the clamps being engaged on respective circumferential end portions of the rim of the ring sector and on corresponding portions of the casing rail. Each of the clamps can hold an end portion of the rim of the ring sector and possibly also an end portion of the rim of an adjacent ring sector if the clamp is mounted over the rims of said two ring sectors.

The clamps may be spaced apart from one another in the circumferential direction by a distance that is greater than or equal to the angular extent or width of a clamp, for example.

Each clamp may have an angular extent or width that is less than about half, preferably less than about one-third, and for example less than about one-fourth the angular extent or width of a ring sector.

The invention also provides a turbomachine compressor or turbine that includes at least one turbine or compressor stage as described above.

The invention also provides a turbomachine, such as an airplane turboprop or turbojet, wherein the turbomachine includes at least one turbine or compressor stage as described above.

BRIEF DESCRIPTION OF THE DRAWINGS

The invention can be better understood and other characteristics, details, and advantages thereof appear more clearly on reading the following description made by way of non-limiting example and with reference to the accompanying drawings, in which.

MORE DETAILED DESCRIPTION

Figure 1:
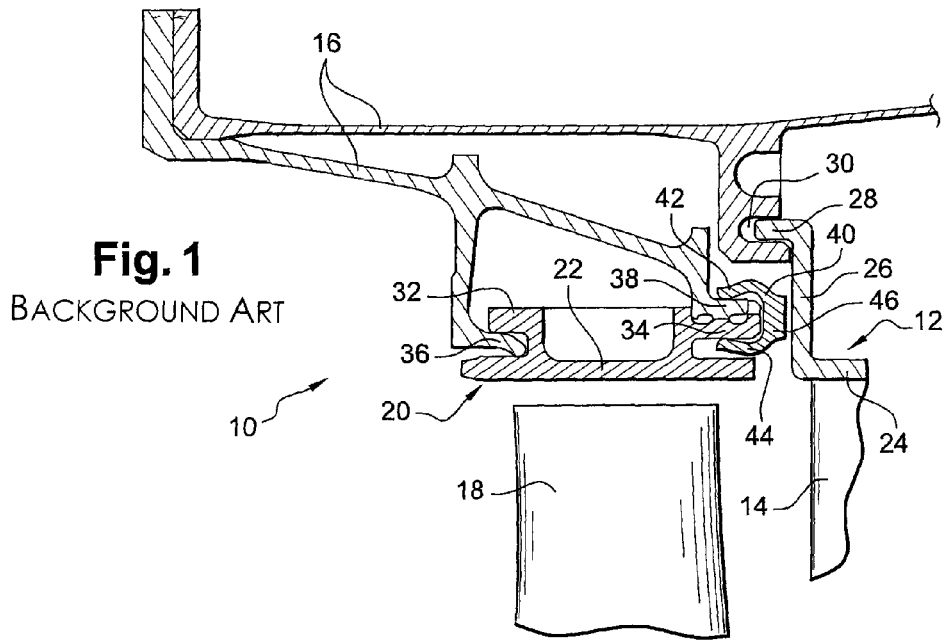
FIG. 1 is a fragmentary diagrammatic half-view in axial section showing a turbine stage of the prior art.

Reference is made initially to FIG. 1, which shows a turbine stage 10 of a turbomachine such as an airplane turboprop or turbojet. The stage 10 includes a nozzle 12 constituted by an annular row of stationary vanes 14 carried by a casing 16 of the turbine, and a blade wheel 18 mounted upstream from the nozzle 12 and revolving in a sectorized ring 20 made up of a plurality of sectors 22 that are carried circumferentially end-to-end by the casing 16 of the turbine.

The nozzle 12 has two circular walls, an outer wall 24 and an inner wall that is not shown, the walls defining between them the annular section for gas flow through the turbine, with the vanes 14 extending radially between them. The means for fastening the nozzle comprise at least one upstream radial tab 26 connected at its outer periphery to a cylindrical rim 28 extending upstream and designed to be engaged in an annular groove 30 open towards the downstream end of the casing 16.

At its upstream and downstream ends, each ring sector 22 has circumferential fastener rims 32, 34 for fastening to the turbine casing 16. These upstream circumferential rims 32 of the ring sectors extend upstream and are engaged against a cylindrical rim 36 of the casing 16, which rim extends downstream. The downstream circumferential rims 34 of the sectors extend downstream and are clamped radially against a cylindrical rail 38 of the casing by means of clamps 40 of C-shaped section having their openings facing axially upstream and that are engaged axially from the downstream end on the casing rail 38 and the downstream circumferential rims 34 of the ring sectors by being deformed elastically. The downstream rims 34 of the ring sectors and the casing rail 38 have substantially the same radius of curvature.

Each clamp 40 comprises two circumferential walls, respectively a radially outer wall 42 and a radially inner wall 44, which walls are interconnected at their downstream ends by a radial wall 46, and they are engaged respectively on the outside of the casing rail 38 and on the inside of the downstream rims 34 of the ring sectors.

The radial wall 46 of the clamp 40 is interposed axially between the downstream ends of the rail 38 and of the rims 34, and the radial wall 26 of the nozzle 12 that is downstream therefrom, thereby preventing the clamp 40 from moving axially downstream and disengaging from the casing rail 38 and the rims 34 of the ring sectors.

Figure 2:
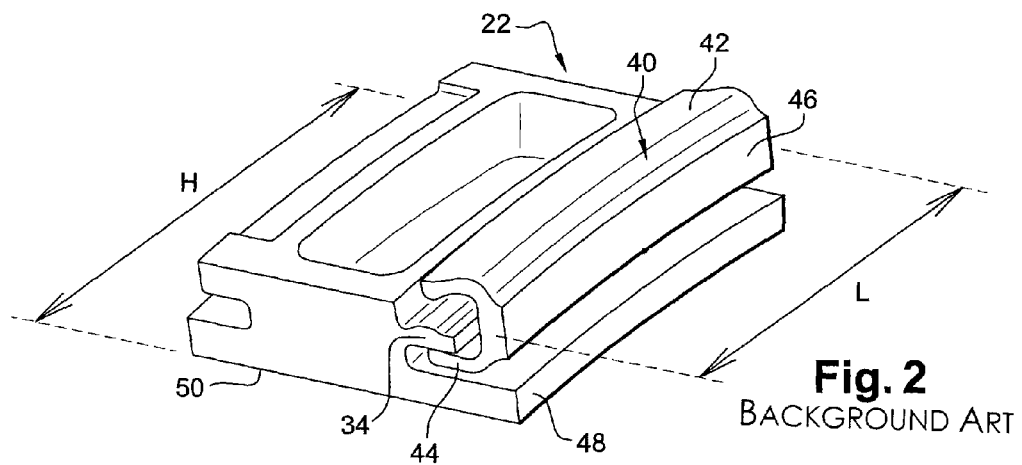
FIG. 2 is a diagrammatic perspective view of a ring sector and of a clamp of the FIG. 1 stage.

As can be seen in FIG. 2, in the prior art, each ring sector 22 is associated with a single clamp 40. The casing rail 38 is not shown in this figure for reasons of clarity. The clamp has an angular extent or width L that is substantially identical to the angular extent or width H of the ring sector. In the assembled position shown in FIG. 2, the lateral faces 48 at the circumferential ends of the clamp lie in radial register with the lateral faces 50 of the ring sector. The lateral faces 48 of each clamp are situated at a short circumferential distance from the lateral faces of the adjacent clamps that run on from one another in almost-abutting manner.

The clamp 40 is preferably engaged on the casing rail 38 and on the circumferential rim 34 of the ring sector with a certain amount of radial prestress. For this purpose, the radial distance between the circumferentially-extending walls 42 and 44 of the clamp in the unmounted configuration (corresponding to the radial size of the opening in the clamp) is less than the sum of the thicknesses in the radial direction of the casing rail 38 plus the downstream rim 34 of the sector, e.g. less by about a few tenths of a millimeter. The clamp 40 thus deforms elastically in the radial direction by its circumferentially-extending walls 42 and 44 moving apart while the clamp is being engaged axially on the rail 38 and the downstream rim 34 of the sector.

Figure 3:
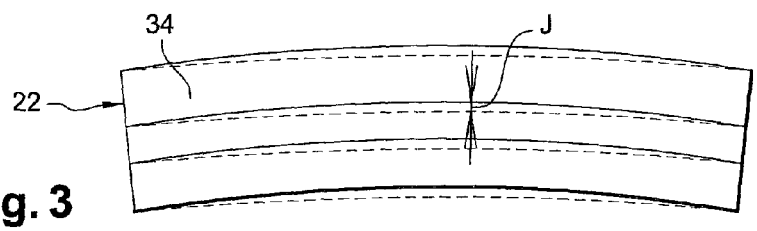
FIG. 3 is a highly diagrammatic fragmentary face view of the FIG. 2 ring sector seen from downstream.

In operation, the ring sector 22 is subjected to a large temperature gradient in the radial direction, which gives rise to the ring sector "unbending" so as to have a radius of curvature that becomes greater than the radius of curvature of the casing rail 38. FIG. 3 shows the shape and the position of the downstream rim 34 of the ring sector in the free state without stress using continuous lines, and in the "unbent" state using dashed lines. The "unbending" of the ring sector gives rise to the circumferential rim 34 of the ring sector moving radially inwards through a distance J, with this distance J varying along the circumferential dimension of the sector, being at its maximum in the middle portion of the sector. This unbending leads to a significant increase in the stresses in the middle portion of the clamp 40, and that can reduce its lifetime.

The invention enables this problem to be remedied by holding the ring sectors 22 against the casing rail 38 by means of clamps that are engaged solely on the end portions of the downstream circumferential rims 34 of the ring sectors. These middle portions of the sector rims 34 are then free to move in operation without transmitting forces to the clamps since they are far enough away from these stress-concentration zones.

Figure 4:
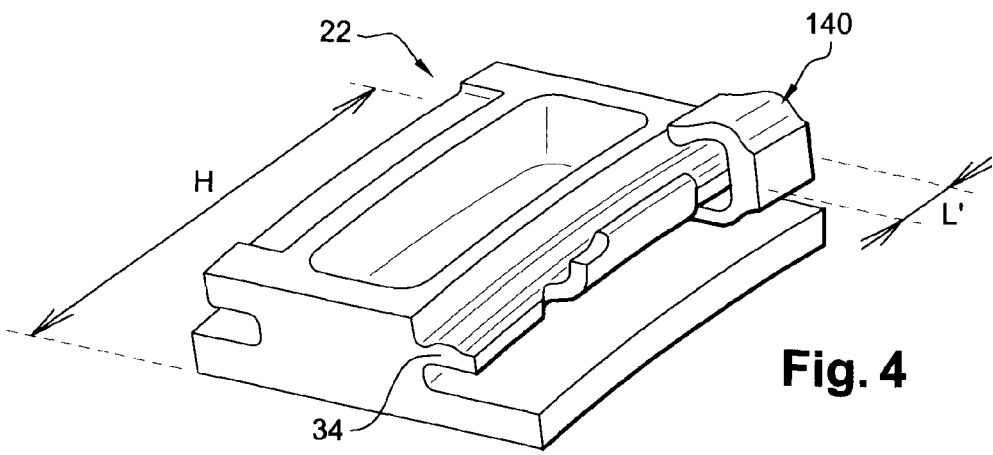
FIG. 4 is a diagrammatic perspective view of a ring sector and of a clamp of the stage of the present invention.

In the embodiment shown in FIG. 4, the clamp 140 presents an angular extent or width L' that is much less than the width of the ring sector 22, which sector width is identical to that of the ring sectors in the prior art. The width L' of the clamp 140 is less than half, preferably less than one-third, and for example less than one-fourth of the width H of the ring sector 22. Each ring sector 22 is associated with a single clamp 140 that is engaged on an end portion of the sector rim 34 and on a corresponding portion of the casing rail 38 (not shown for reasons of clarity). The number of clamps is thus identical in this embodiment to the number of ring sectors.

Figure 5:
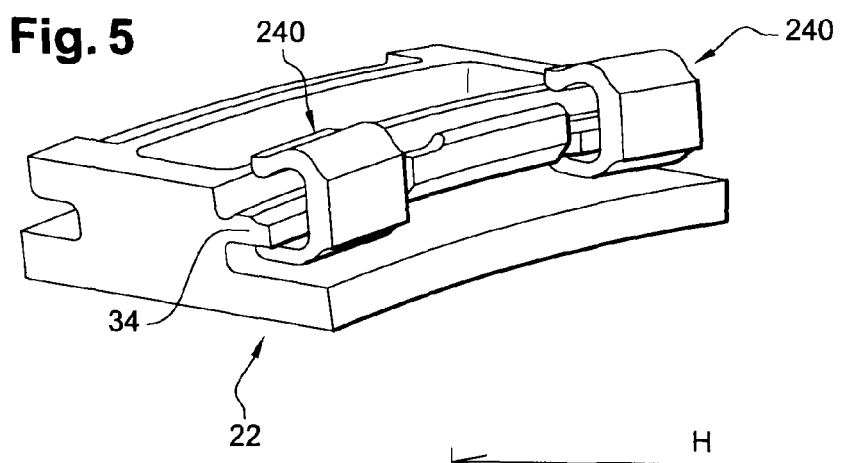
FIG. 5 is a diagrammatic perspective view of a ring sector and of two clamps in a variant embodiment of the invention.
Figure 6:
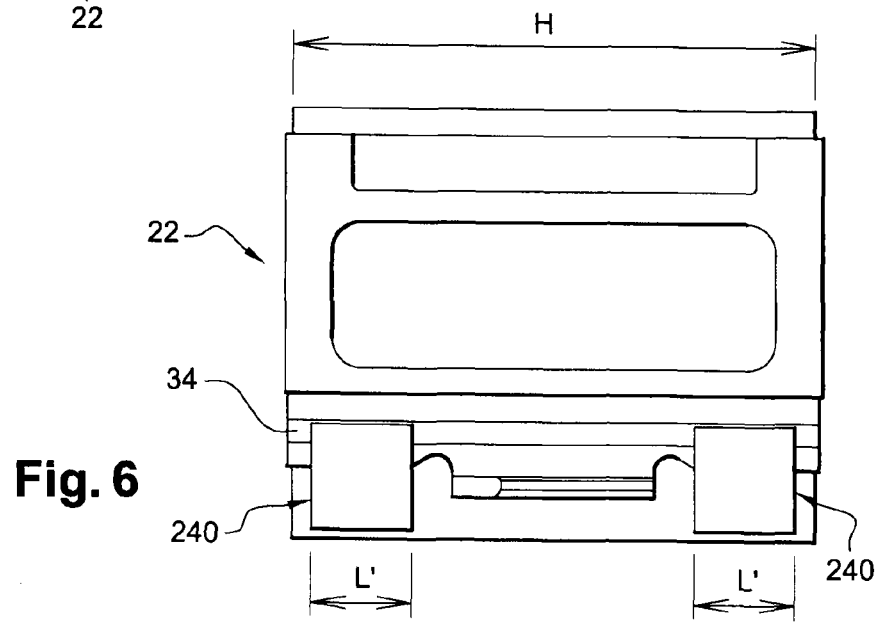
FIG. 6 is a diagrammatic plan view of the ring sector and the clamps of FIG. 5.

In the variant embodiment shown in FIGS. 5 and 6, the ring sector 22 is associated with two clamps 240 that are engaged on respective end portions of the downstream rim 34 of the ring sector and on the corresponding portions of the casing rail 38. The number of clamps is then twice the number of ring sectors. The clamps 240 are substantially identical to one another and to the clamps 140 of FIG. 4, and they are situated at a relatively great circumferential distance from one another, said circumferential distance corresponding, for example, to the sum of the widths of two or three clamps.

As in the prior art, the clamps 140 and 240 are prevented from moving axially downstream by bearing against the radial wall 26 of the nozzle 12 that is situated downstream therefrom (FIG. 1). When the clamps 140, 240 are mounted on the casing rail 34 and on the downstream rims 38 of the ring sectors, the radial prestress suffices to prevent them from moving in the circumferential direction. When said radial prestress is zero or not sufficient for preventing the clamps from moving in a circumferential direction, then systems are provided for blocking the clamps circumferentially.

What is claimed is:

1. A turbine or compressor stage for a turbomachine, the stage comprising:
   at least one blade wheel surrounded by a sectorized ring carried by a casing and including a circumferential rim that is clamped radially against an annular rail of the casing by means of resilient clamps that are substantially of C-shaped section and that are engaged axially on the casing rail and on the ring rim,
   wherein each ring sector is held against the casing rail by at least one clamp that is engaged solely on a circumferential end portion of the rim of the ring sector and on a corresponding portion of the casing rail.

2. A stage according to claim 1, wherein the clamps are of an angular extent or width that is less than an angular extent or width of a ring sector.

3. A stage according to claim 1, wherein each ring sector is held against the casing rail by a single clamp, the clamp being engaged on a circumferential end portion of the rim of the ring sector and on a corresponding portion of the casing rail.

4. A stage according to claim 1, wherein each ring sector is held against the casing rail by two clamps, the clamps being engaged on respective circumferential end portions of the rim of the ring sector and on corresponding portions of the casing rail.

5. A stage according to claim 1, wherein the clamps are spaced apart from one another in the circumferential direction by a distance that is greater than or equal to the angular extent or width of a clamp.

6. A stage according to claim 1, wherein each clamp is of an angular extent or width that is less than about half the angular extent or width of a ring sector.

7. A stage according to claim 1, wherein each clamp is of an angular extent or width that is less than about one-third the angular extent or width of a ring sector.

8. A stage according to claim 1, wherein each clamp is of an angular extent or width that is less than about one-fourth the angular extent or width of a ring sector.

9. A stage according to claim 1, wherein the clamps are identical to one another.

10. A turbomachine compressor or turbine that includes at least one turbine or compressor stage according to claim 1.

11. A turbomachine that includes at least one turbine or compressor stage according to claim 1.

12. A stage according to claim 1, wherein a middle circumferential portion of the rim of the ring sector and a middle circumferential portion of the casing rail are free of the at least one claim.

* * * * *

UNITED STATES PATENT AND TRADEMARK OFFICE
CERTIFICATE OF CORRECTION

| | | |
|---|---|---|
| PATENT NO. | : 8,277,179 B2 | Page 1 of 1 |
| APPLICATION NO. | : 12/266929 | |
| DATED | : October 2, 2012 | |
| INVENTOR(S) | : David Audeon et al. | |

It is certified that error appears in the above-identified patent and that said Letters Patent is hereby corrected as shown below:

Column 6, line 13, change "claim" to --clamp--.

Signed and Sealed this
Twenty-fifth Day of December, 2012

David J. Kappos
*Director of the United States Patent and Trademark Office*